(12) United States Patent
Hirao

(10) Patent No.: US 12,250,346 B2
(45) Date of Patent: Mar. 11, 2025

(54) IMAGE PROCESSING APPARATUS AND METHOD FOR CONTROLLING THE SAME FOR MOVING A SENSOR AND READING AN IMAGE

(71) Applicant: CANON KABUSHIKI KAISHA, Tokyo (JP)

(72) Inventor: Toyomi Hirao, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/054,681

(22) Filed: Nov. 11, 2022

(65) Prior Publication Data

US 2023/0156126 A1 May 18, 2023

(30) Foreign Application Priority Data

Nov. 16, 2021 (JP) .................................. 2021-186700

(51) Int. Cl.
*H04N 1/00* (2006.01)
(52) U.S. Cl.
CPC .............................. *H04N 1/00018* (2013.01)
(58) Field of Classification Search
CPC ..... H04N 1/00018; H04N 1/121; H04N 1/123
See application file for complete search history.

(56) References Cited

U.S. PATENT DOCUMENTS

| | | | | |
|---|---|---|---|---|
| 6,097,852 A * | 8/2000 | Yamamoto | ......... | H04N 1/00713 |
| | | | | 382/282 |
| 6,285,047 B1 * | 9/2001 | Machida | ........... | H01L 27/14632 |
| | | | | 257/443 |
| 8,913,285 B1 * | 12/2014 | Neubrand | ............ | H04N 1/3873 |
| | | | | 358/1.9 |
| 10,148,848 B2 * | 12/2018 | Harada | .............. | G06K 15/1809 |
| 10,827,093 B1 * | 11/2020 | Velayutham | ....... | H04N 1/00482 |
| 2008/0198426 A1 * | 8/2008 | Yokochi | ................. | H04N 1/121 |
| | | | | 358/486 |
| 2013/0329248 A1 * | 12/2013 | Shinto | ................ | H04N 1/00442 |
| | | | | 358/1.15 |
| 2019/0230246 A1 * | 7/2019 | Abaquita | ........... | H04N 1/00411 |
| 2020/0137261 A1 * | 4/2020 | Hirao | ..................... | H04N 1/047 |
| 2020/0357121 A1 * | 11/2020 | Kawara | ............. | H04N 1/00816 |

FOREIGN PATENT DOCUMENTS

JP 2021111907 A 8/2021

* cited by examiner

*Primary Examiner* — Juan M Guillermety
(74) *Attorney, Agent, or Firm* — Canon U.S.A., Inc. IP Division

(57) ABSTRACT

An image processing apparatus includes a sensor unit having a length in a main scanning direction greater than a length in a sub-scanning direction in which reading is performable by movement of the sensor unit. The image processing apparatus executes, twice, processing of moving the sensor unit from a reference position to a predetermined position and reading an image of a document to generate first image data and second image data, and outputs first extraction data generated by executing first extraction processing on the first image data, as one piece of page data, and to output second extraction data generated by executing second extraction processing on the second image data, as one piece of page data.

5 Claims, 9 Drawing Sheets

IMAGE PROCESSING APPARATUS AND METHOD FOR CONTROLLING THE SAME FOR MOVING A SENSOR AND READING AN IMAGE

BACKGROUND

Field of the Disclosure

The present disclosure relates to an image processing apparatus and a method for controlling the image processing apparatus.

Description of the Related Art

Some available image processing apparatuses support a book scan mode in which a double-page spread document, such as a book, is read page by page as images of two pages by two reading processes (see Japanese Patent Application Laid-Open No. 2021-111907). In the book scan mode, the document is generally placed such that a short-side direction of the document is parallel to a line sensor and a long-side direction of the document is perpendicular to the line sensor. In a case where the document is placed in such a manner, the document is divided at a center in the long-side direction of the document. In a first reading process, the document is read in the short-side direction as a main scanning size, and the document from an origin to a position corresponding to ½ of the size in the long-side direction is read as a sub-scanning size. In a second reading process, the document is read in the short-side direction as a main scanning size as in the first reading process, and the document from the position corresponding to ½ of the size to a trailing edge of the document in the long-side direction is read in a sub-scanning direction. As a result, the double-page spread document is read.

A scanner of a pressing plate type of the existing image processing apparatus scans the document with the above-described reading method because a length in the sub-scanning direction in which reading is performable is greater than a length in the main scanning direction in which reading is performable.

By contrast, a scanner in which a moving distance of the line sensor is made small, and the length in the main scanning direction in which reading is performable is made greater than the length in the sub-scanning direction in which reading is performable in order to reduce a scanning time is considered. In such a scanner, the document is placed on a platen such that the long-side direction of the document is parallel to the line sensor. Therefore, the document cannot be read in the book scan mode as discussed in Japanese Patent Application Laid-Open No. 2021-111907.

SUMMARY

Embodiments of the present disclosure are directed to a technique by which appropriate scanning is performable in the book scan mode in the scanner of the pressing plate type in which the length in the main scanning direction in which reading is performable is greater than the length in the sub-scanning direction in which reading is performable.

According to embodiments of the present disclosure, an image processing apparatus including a sensor unit having a length in a main scanning direction greater than a length in a sub-scanning direction in which reading is performable by movement of the sensor unit. The image processing apparatus includes an execution unit configured to execute, twice, processing of moving the sensor unit from a reference position to a predetermined position and reading an image of a document, based on one execution instruction input by a user, to generate first image data and second image data, and an output unit configured to output first extraction data generated by executing first extraction processing on the first image data, as one piece of page data, and to output second extraction data generated by executing second extraction processing on the second image data, as one piece of page data.

Further features of the present disclosure will become apparent from the following description of exemplary embodiments with reference to the attached drawings.

DESCRIPTION OF THE EMBODIMENTS

Some exemplary embodiments of the present disclosure are described below with reference to accompanying drawings. Configurations described in the following exemplary embodiments are merely illustrative, and the present disclosure is not limited to illustrated configurations.

In a first exemplary embodiment, an image processing apparatus specialized in processing for an A4-size document will be described as a premise; however, a configuration to which a large-size document, such as A3 size and B4 size, is also adoptable.

Figure 1:
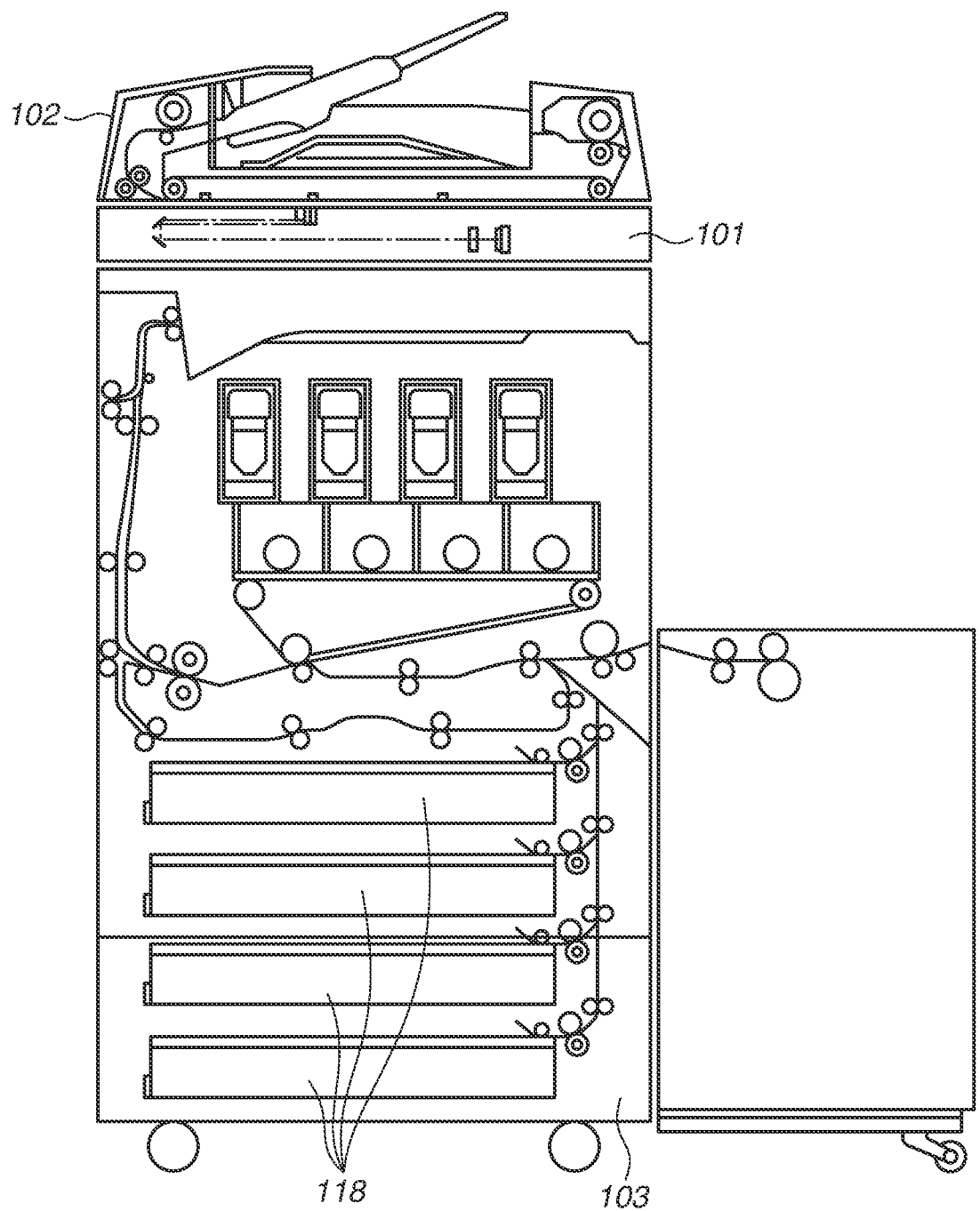
FIG. 1 is a sectional view of an image processing apparatus.

FIG. 1 is a sectional view of a multifunctional peripheral (MFP) that is the image processing apparatus according to the present exemplary embodiment. The MFP has functions of a copying apparatus, a printer, and a facsimile (FAX). In FIG. 1, the MFP includes a document reading apparatus that includes a scanner 101 and a document feeder (ADF) 102, a printing unit 103 for print recording, including drums of four colors, and sheet feeding decks 118. In the present exemplary embodiment, detailed descriptions of the document feeder 102, the printing unit 103, the sheet feeding decks 118, and the like are omitted because of low relevance. Details of a hardware configuration of a controller that controls a scanner unit, a printer unit, and a network interface unit of the MFP will be described with reference to FIG. 2.

Figure 2:
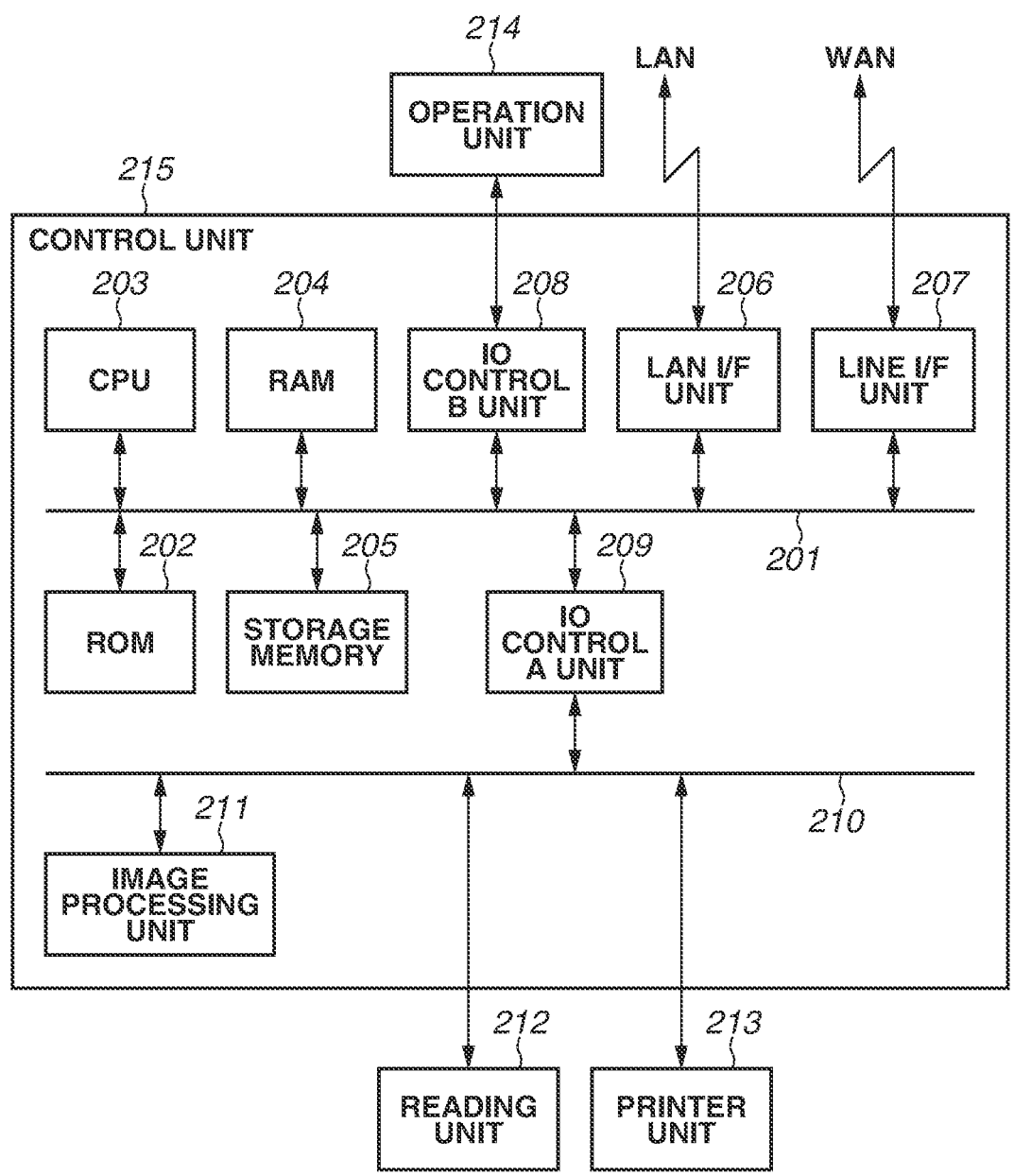
FIG. 2 is a block diagram of a control unit of the image processing apparatus.

FIG. 2 is a block diagram of a control unit 215 configuring the MFP according to the present exemplary embodiment. Configuration units of the control unit 215 are connected to a system bus 201 and an image bus 210. A read only memory (ROM) 202 stores a boot program of a system. Further, system software realizing the units of the present exemplary embodiment is stored in the ROM 202 or a storage memory 205, and is executed by a central processing unit (CPU) 203.

A random access memory (RAM) 204 is a system work memory area for the CPU 203 to execute software, and is also an image memory temporarily storing image data when the image data is processed. The storage memory 205 is used as an internal storage. Data read by a reading unit, image data, the system software, and the like are stored in the storage memory 205. The storage memory 205 includes a hard disk drive (HDD) or a solid-state drive (SSD). The storage memory 205 is divided into a plurality of sections, and can store a read document in each of the sections.

A local area network (LAN) interface (I/F) unit 206 is used for connection with a LAN, and performs input/output of information with each of apparatuses connected to a LAN. The above-described devices are disposed on the system bus 201. A line I/F unit 207 for connection with a wide area network (WAN) is also provided.

An input-output (IO) control A unit 209 is a bus bridge that connects the system bus 201 and the image bus 210 transferring image data at high speed, and converts a data structure of the system bus 201. The image bus 210 includes a general-purpose bus, such as a peripheral component interconnect (PCI) bus, an Institute of Electrical and Electronics Engineers (IEEE) 1394 bus, and a PCI-Express (PCIEx) bus. The following devices are disposed on the image bus 210. A reading unit 212 serving as an image input/output device, a printer unit 213, and an image processing unit 211 are connected to perform synchronization/asynchronization conversion of the image data. A communication bus for exchange of a control instruction to execute control operation of the printer unit 213 and/or the reading unit 212, issued from the control unit 215 is connected between the printer unit 213 and the reading unit 212.

The reading unit 212 is a module including the scanner 101 and the document feeder 102 in FIG. 1.

The communication bus is realized by using a general-purpose communication protocol, such as Universal Asynchronous Receiver/Transmitter (UART) (or recommended standard 232 (RS-232C)) and a universal serial bus (USB), or a dedicated communication protocol. The image processing unit 211 performs image processing, such as resolution conversion, compression/decompression, binary/multivalue conversion, and trimming, on input image data and output image data. In addition, the image processing unit 211 receives image data from the reading unit 212, and transfers the received image data to the RAM 204 through the image bus 210 and the system bus 201.

The processing of the image processing unit 211 is realized by image processing application specific integrated circuits (ASIC), which is hardware, and the software that is executed by the CPU 203 controlling the image processing ASIC. The image processing ASIC includes a register to set a format of data to be processed and processing details, and the image processing unit 211 performs the image processing by causing the control software that is executed by the CPU 203 to perform setting of the register of the image processing ASIC.

An IO control B unit 208 is an I/F unit for interface with an operation unit 214 (user interface [UI]), and outputs image data to be displayed on the operation unit 214, to the operation unit 214. The IO control B unit 208 transfers information input by a user through the operation unit 214, to the CPU 203. The IO control B unit 208 is an I/F unit used for software to control the operation unit 214 mounted with a display device and a keypad device. In the present exemplary embodiment, the operation unit 214 includes a liquid crystal display (LCD) touch panel, interprets a video graphics array (VGA) signal output from the IO control B unit 208, and display the resultant.

Figure 3:
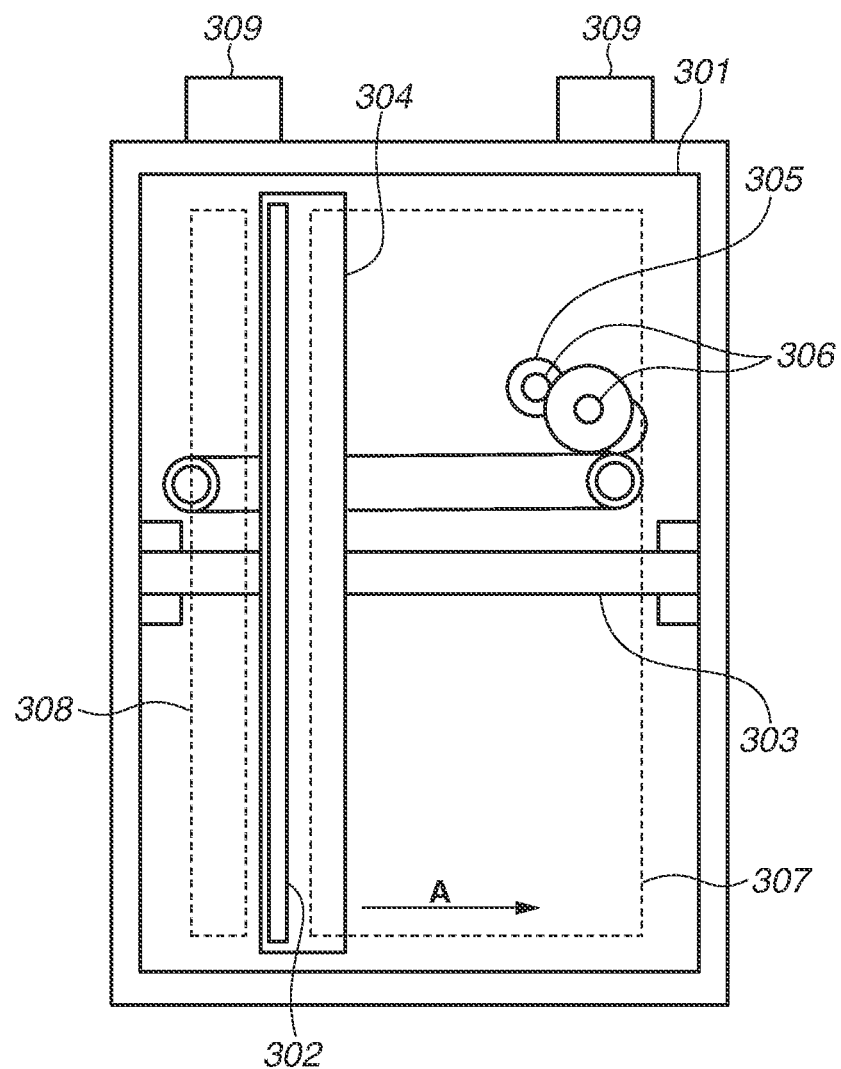
FIG. 3 is a sectional top view of a scanner.

Next, a configuration and operation of the scanner are described with reference to FIG. 3. FIG. 3 is a sectional top view illustrating a schematic configuration of the scanner 101 in FIG. 1. As illustrated in FIG. 3, the scanner 101 includes a frame body 301, and a sensor unit 302 including a base and a sensor mounted on the base. The sensor unit is, for example, a line sensor including a plurality of pixels arranged in a line.

The frame body 301 include a reference shaft 303 that is a reference of movement of the sensor unit 302 in a sub-scanning direction (direction of arrow A). In the present exemplary embodiment, a length of the sensor unit 302 is greater than a moving range of the sensor unit 302 in the sub-scanning direction.

In other words, a length in a main scanning direction in which reading is performable is greater than a length in the sub-scanning direction in which reading is performable. Driving force from a flatbed (FB) reading stepping motor 305 (hereinafter, stepping motor) is transmitted to a belt 304 via a gear group 306. Further, the sensor unit 302 is moved along the reference shaft 303 by the belt 304. The frame body 301 includes a platen glass (platen) 307 on which a document is to be placed, and a DF reading window 308 for DF scan. The DF reading window 308 is made of a material that allows light of a light-emitting diode serving as a light source to pass therethrough, as with the platen glass 307.

The sensor unit 302 can be freely moved in an area of the platen glass 307 and the DF reading window 308. More specifically, the sensor unit 302 can be moved by a predetermined amount by controlling the number of driving input pulses to the stepping motor 305. A length of the sensor unit 302 in the main scanning direction is greater than a length in the sub-scanning direction in which reading is performable by movement of the sensor unit 302.

The document reading apparatus having received a scan instruction from the CPU 203 drives the stepping motor 305, and drives the belt 304 via the gear group 306. This moves the sensor unit 302 in the sub-scanning direction along the reference shaft 303, thereby reading the document placed on the platen glass 307. The scanner 101 includes a mechanism for detecting a size of the document placed on the platen glass 307. There are various methods for such a detection, and illustrations and detailed descriptions of the detection methods are omitted.

The scanner 101 notifies the control unit 215 of the detected document size. The control unit 215 controls reading operation of book scanning based on the notified document size. The sensor unit 302 performs reading in the main scanning direction with the maximum width of the sensor unit 302, irrespective of the size of the document in the main scanning direction. The image processing unit 211 of the control unit 215 performs trimming processing on the image read with the maximum width, to extract a necessary area.

While illustrations and detailed descriptions are not provided in the present exemplary embodiment, in a case where trimming is performed in the sub-scanning direction, only an area to be used can be extracted by designating a start position and an end position in the sub-scanning direction in a reading instruction issued to the scanner 101. In such a case, the scanner 101 drives the belt 304 to reduce an area where the sensor unit 302 is moved, thus reading an area smaller than the document size, starting from a leading edge. To perform trimming from partway to the trailing edge in the sub-scanning direction, the scanner 101 does not output image signals from the leading edge to a designated position. The trimming is realized by moving the sensor unit 302 to a designated trimming start position, and then performing reading and output of image signals.

Figure 4:
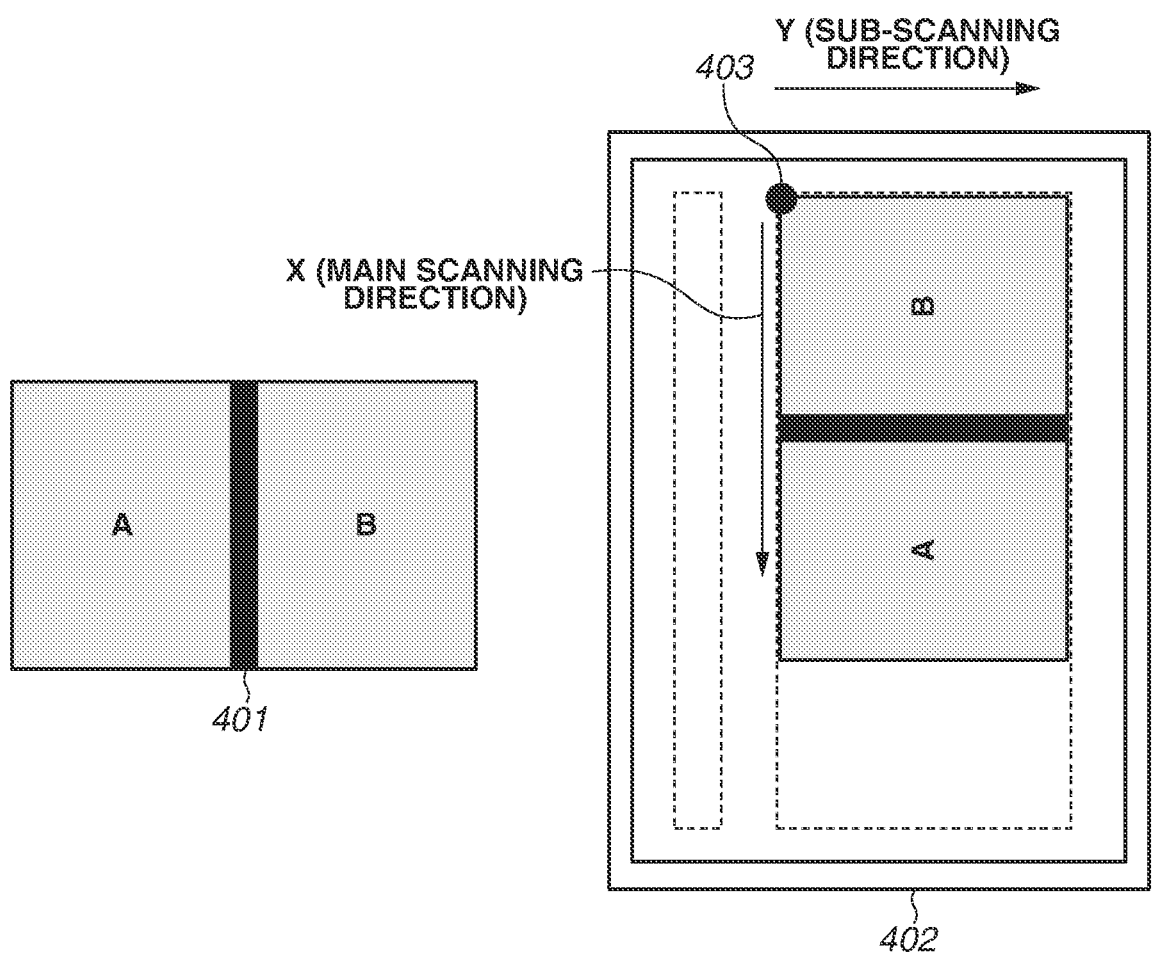
FIG. 4 is a conceptual diagram of book scanning.

Placement of a double-page spread document in the present exemplary embodiment is described with reference to FIG. 4. FIG. 4 is a diagram illustrating an example of a method of placing the double-page spread document.

A document 401 is a schematic diagram of a double-page spread document, such as a book. In the present exemplary embodiment, pages of the double-page spread document progress in order from left to right; however, the configuration of the double-page spread document to which the present exemplary embodiment is applicable is not limited thereto. For example, pages of the double-page spread document may progress in order from right to left. A placement example 402 illustrates a case where the double-page spread document is placed on the platen glass 307. In the scanner 101, a reference point (403) of a reading position is located at an upper left position of the platen glass 307. When the control unit 215 instructs coordinates from the reference point, the scanner 101 reads a designated area, and sequentially transfers the read image to the control unit 215. Determination of the reading position from the above-described reference point 403 and the instruction to the scanner 101 are realized by control software operating on the CPU 203 of the control unit 215. The reference point 403 may be set by the user via the operation unit 214.

Figure 5:
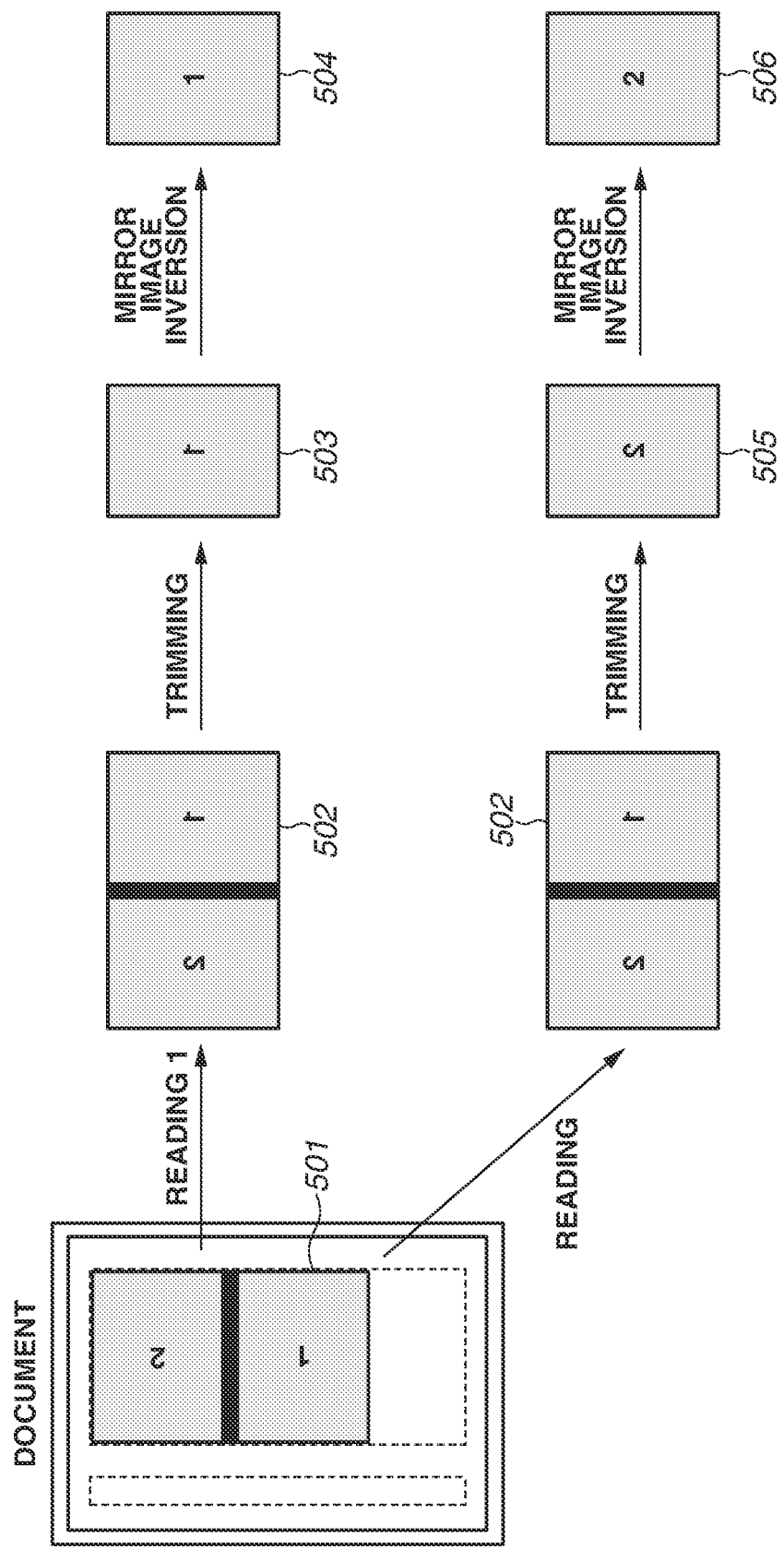
FIG. 5 is a conceptual diagram of image processing and reading control in a book scan mode.

In the book scan mode, the reading instruction to the scanner 101, the image processing to be applied to the read image, and the read image are described with reference to FIG. 5 and a flowchart in FIG. 6.

Figure 6:
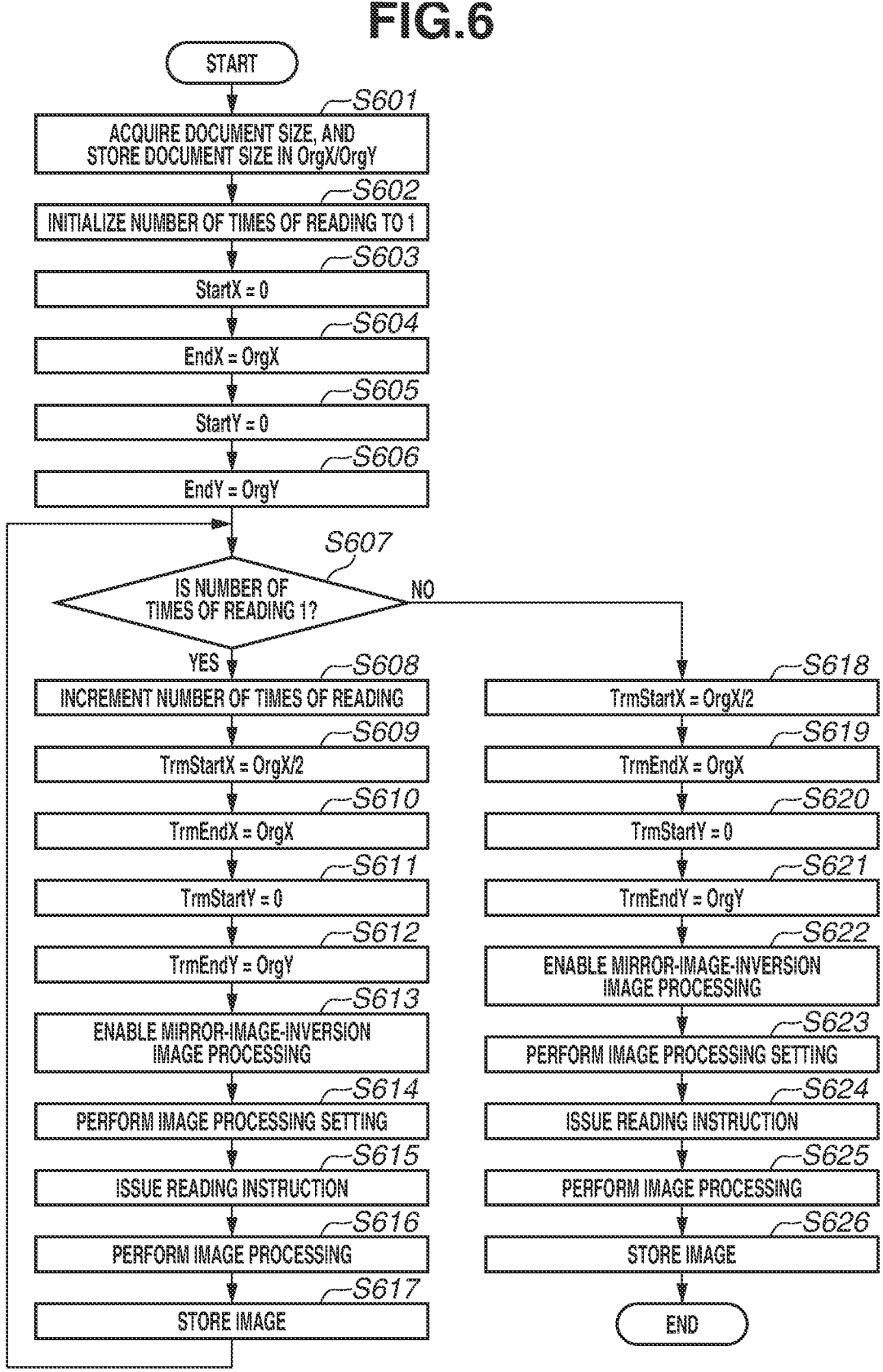
FIG. 6 is a flowchart in the book scan mode.

FIG. 6 is a flowchart illustrating an example of processing in the book scan mode. The flowchart in FIG. 6 is realized by a control application that is stored in the ROM 202 and operates on the CPU 203. In the present exemplary embodiment, a scanner control unit that is connected to the reading unit 212 and controls the scanner 101 interprets the reading instruction, and drives the sensor unit 302 and the stepping motor 305 to read an image. A control instruction and configuration information, such as a size readable by the scanner, are exchanged between the scanner control unit and the control unit 215 through communication using a communication standard, such as RS-232C.

In the present exemplary embodiment, only the double-page spread document with pages to be turned over from right to left is described; however, application of the present exemplary embodiment is not limited to the double-page spread document with pages to be turned over from right to left.

Initially, in step S601, size information about a document 501 placed on the platen glass 307 is acquired using the document size detection sensor mechanism of the scanner 101. The acquired document size information is stored as a main scanning direction size and a sub-scanning direction size in variables of OrgX/OrgY secured in the RAM 204, respectively. Thereafter, in step S602, the number of times of reading is initialized to one. The number of times of reading is a variable similarly held in the RAM 204. In steps S603 to S606, an area to be read by the scanner 101 is designated. Since the sensor unit 302 does not include a trimming mechanism in the main scanning direction, StartX and EndX are designated for convenience, but image data corresponding to an entire width of the sensor unit 302 is transmitted to the control unit 215. In the sub-scanning direction, an entire area is read. In the book scan mode according to the present exemplary embodiment, while an image of one document is read through two processes, images read through the two processes are the same as each other. Image data 502 generated by scanning the document is transmitted to the control unit 215.

At this point, the reading instruction is not issued. Thus, the scanner 101 does not operate. After calculation of the reading position ends, the number of times of reading is checked in step S607. At this point, the scanning is a first scan process (YES in step S607). Thus, the processing proceeds to step S608. In step S608, the number of times of reading is incremented for next document process. In steps S609 to S612, calculating setting for trimming and mirror image determination to be performed on the image read by the scanner 101 is performed. In the first scan process, a trailing edge in the main scanning direction is read. Thus, in step S609, a trimming start position (TrmStartX) is set to a position indicated by Org/2. A center part of the double-page spread document is set to a head position of an effective image. Subsequently, in step S610, a trimming end position (TrmEndX) is set to OrgX. In steps S611 and S612, a trimming start position and a trimming end position in the sub-scanning direction are similarly set. In the sub-scanning direction, the entire document size is to be read. Thus, TrmStartY is set to zero, and TrmEndY is set to OrgY. The trimming setting of the image ends in step S612, and the image read with the setting becomes a trimming image (extracted data) 503 of a first page in FIG. 5. It is found from FIG. 5 that the image is in a mirror image state relative to the orientation of the double-page spread document.

To correct the mirror image state, mirror-image-inversion image processing is turned on in step S613. An image having been subjected to the mirror-image-inversion image processing becomes a mirror-image inverted image 1 (504). After the trimming position is calculated and the determination of the mirror-image-inversion image processing being turned on, setting is performed on the image processing ASIC that configures the image processing unit 211 which actually performs the image processing.

After the setting is performed, the reading instruction is issued to the scanner 101 in step S615. The above-described information about StartX/EndX and StartY/EndY are included in the reading instruction. The scanner control unit having received the reading instruction reads an image as designated, and transmits the read image to the control unit 215.

At this time, StartX and EndX are designated for convenience, but the scanner 101 reads the designated area only in the sub-scanning direction because the scanner 101 cannot perform image trimming in the main scanning direction. As a result of the reading instruction, the image is input to the image processing unit 211 via the reading unit 212, and the trimming of the image and the mirror image determination for determining whether the image is the mirror image are performed in accordance with preset image processing setting, in step S616.

The image to be finally output is one as indicated by the output image 1 (504), and in step S617, the output image 1 (504) is stored as the image data in the storage memory 205.

In the present exemplary embodiment, to simplify the description, only the trimming and the mirror-image-inversion image processing are applied; however, application of the present exemplary embodiment is not limited only to the above-described two image processing. For example, other image processing such as background deletion, rotation, and magnification, or compression of image data to reduce a capacity in the storage memory 205 may be performed.

At a time when step S617 ends, only the first page of the document has been read. To continuously read the second page, the processing returns to step S607. Since the number of times of reading has been set to two in step S608, the processing proceeds to step S618. While steps S618 to S621 are steps of determining the trimming position, unlike the first page, StartX is set to zero, and EndX is set to OrgX/2. Such setting is performed because, as for the second page, it is sufficient to read the document from the reference point to a position corresponding to half of the main scanning direction size OrgX, in the main scanning direction.

In the sub-scanning direction, the trimming position is calculated with the entire area serving as a read target, as with the first page. The second page is also read in the mirror image state. Thus in step S622, the mirror-image-inversion image processing is turned on.

In a manner similar to the first page, the image processing setting in step S623 and the reading instruction in step S624 are performed, and the trimming and the mirror-image-inversion image processing are performed on the image read by the scanner. In the reading of the second page, the same image (read image data 502) is obtained by the scanner. In other words, the process of reading the image of the document is performed twice by moving the sensor unit 302 from the reference position to the predetermined position based on a single execution instruction input by the user, thus generating the first image data and the second image data.

Here, since the trimming start position is different, the leading-edge side in the main scanning direction is trimmed (image 505), unlike the first page. The mirror-image-inversion image processing is similarly performed, and an output image 506 is stored in the storage memory 205. In this process, a portion corresponding to a portion not extracted in the trimming for the first page is trimmed from the image of the second image data.

In other words, the first extraction data generated by performing the first extraction process on the first image data can be output as one piece of page data. The second extraction data generated by performing the second extraction process on the second image data can be output as one piece of page data. More specifically, the "output" here means that the image based on the first extraction data is printed on one sheet and the image based on the second extraction data is printed on one sheet different from the sheet for the first extraction data.

Such processing enables provision of the book scan mode even in the image processing apparatus in which the length of the sensor unit in the main scanning direction is greater than the length in the sub-scanning direction in which an image is readable by movement of the sensor unit. In the present exemplary embodiment, the double-page spread document with pages to be turned over from right to left is described. In a case of the document with pages to be turned over from left to right, the reading in the book scan mode can be similarly performed by changing the order of steps S609 to S612 and steps S618 to S621.

A second exemplary embodiment of the present disclosure will be described. Use of the existing scanner (in which length of sensor unit 302 in main scanning direction is less than length in sub-scanning direction in which reading is performable by movement of sensor unit 302) is advantageous in a production cost because the sensor unit 302 is small. Thus, an image processing apparatus in which either the scanner according to the first exemplary embodiment or the existing scanner is connectable and a model configuration is selectable depending on whether priority is given to productivity or cost, may be provided. In such a configuration, the control unit 215 switches and operates the book scan mode 1 (operation in first exemplary embodiment) and a book scan mode 2.

In other words, the control unit 215 appropriately issues the reading instruction to the scanner control unit based on the connected scanner, which makes it possible to provide the appropriate book scan mode with either the scanner according to the first exemplary embodiment or the existing scanner. It is possible to determine which of the scanner according to the first exemplary embodiment and the existing scanner is connected, by exchanging configuration information illustrated in Table 1 between the control unit 215 and the scanner control unit. Table 1 and Table 2 each illustrate an example of the configuration information.

TABLE 1

Example of Configuration Information (Scanner in First Exemplary Embodiment)

| Configuration Information Name | Value |
| --- | --- |
| Feed Direction | Long Edge Feed |
| Readable Width in Main Scanning Direction | 297 mm |
| Readable Width in Sub-Scanning Direction | 210 mm |
| . . . | . . . |

TABLE 2

Example of Configuration Information (Existing Scanner)

| Configuration Information Name | Value |
| --- | --- |
| Feed Direction | Short Edge Feed |
| Readable Width in Main Scanning Direction | 210 mm |
| Readable Width in Sub-Scanning Direction | 297 mm |
| . . . | . . . |

The configuration information is stored in the scanner control unit, and is exchanged between the scanner control unit and the control unit 215 before start of scanning, for example, during startup processing of the image processing apparatus.

Figure 7:
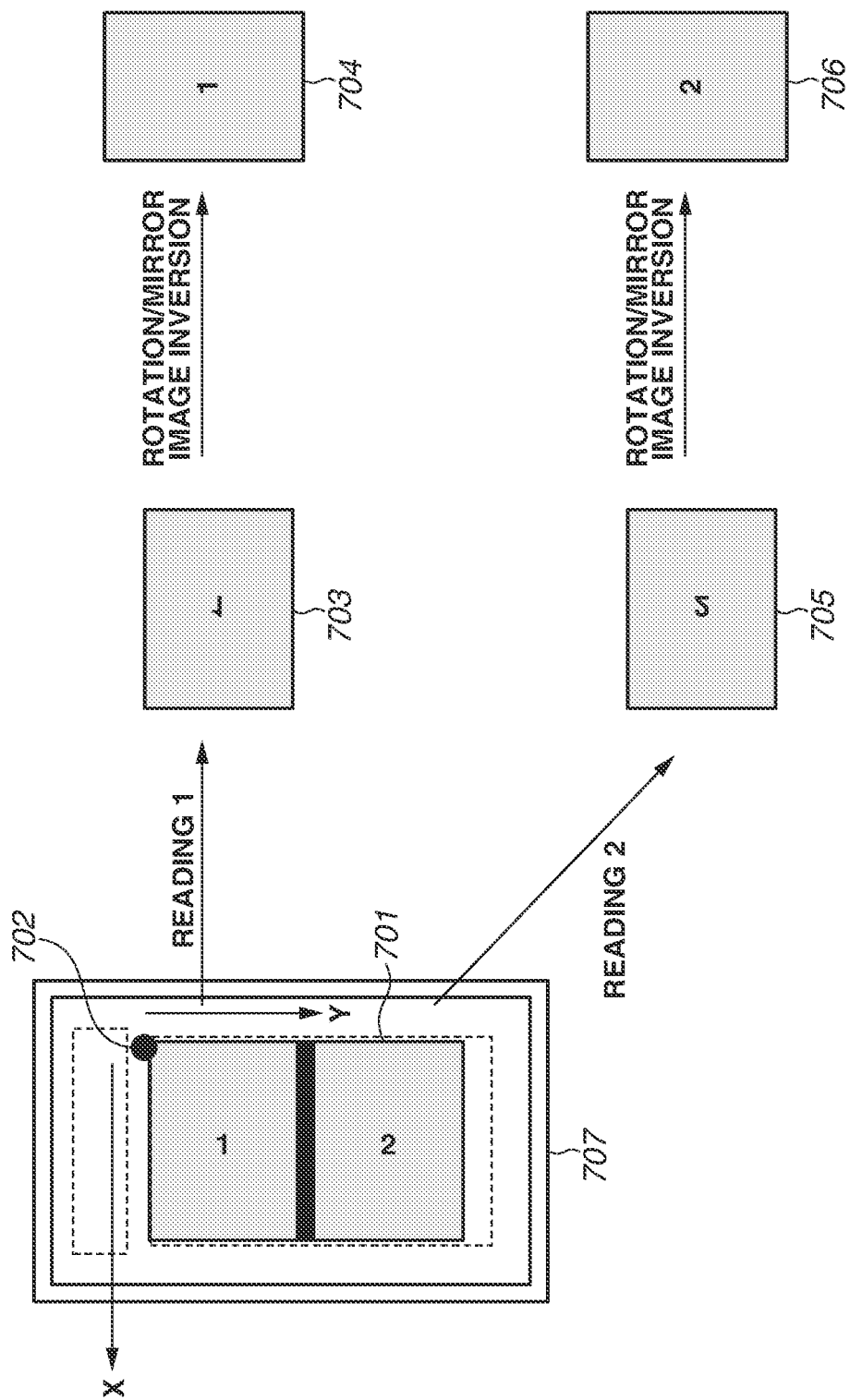
FIG. 7 is a conceptual diagram of image processing and reading control in a book scan mode 2.

An example of the existing scanner according to the present exemplary embodiment is described with reference to FIG. 7. A conceptual diagram 707 illustrates a case where the scanner is disposed parallel to the short-side direction, and the main scanning direction and the sub-scanning direction are replaced with each other. At this time, a double-page spread document 701 is disposed on the platen in such a manner that the sensor unit and a long-side direction of the document are orthogonal to each other. An origin 702 of the reading position in this configuration is an upper right reference point of the document.

Figure 8:
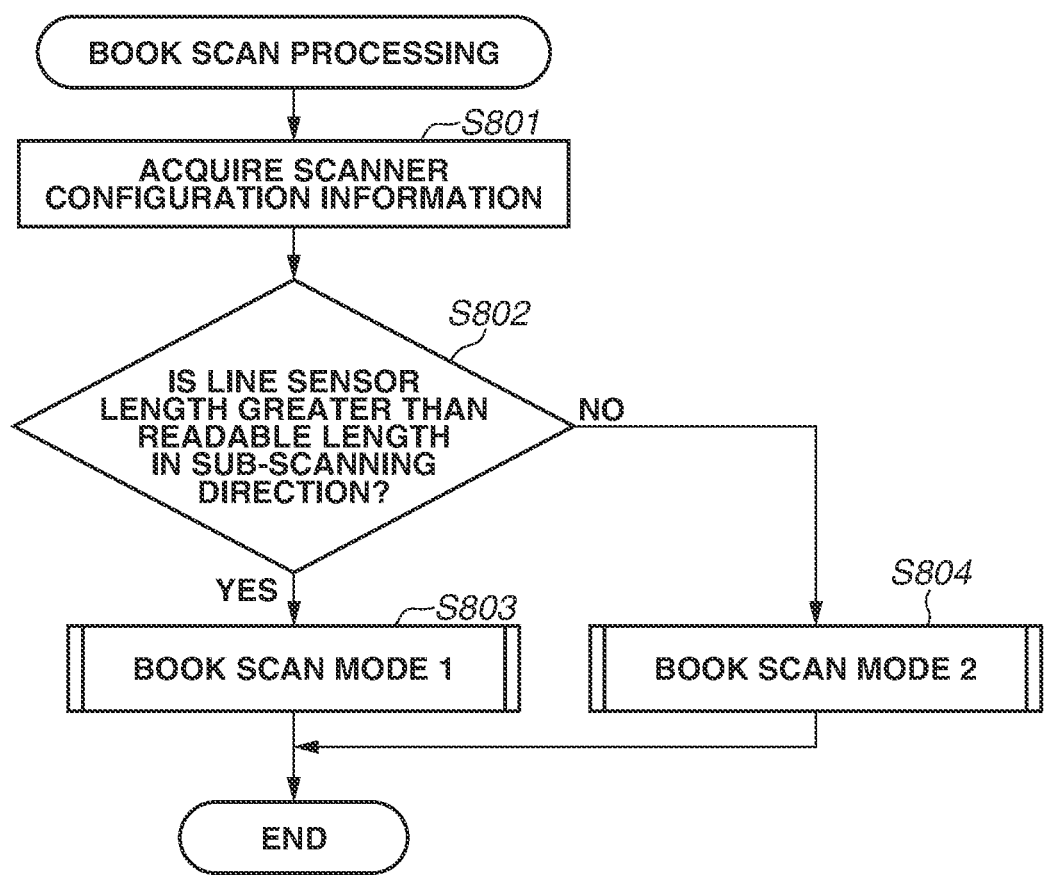
FIG. 8 is a flowchart of the book scanning.

In the book scan mode 2, in the first scan process, the entire document is read in the main scanning direction, and the document from the origin to a half position in the long-side direction is read in the sub-scanning direction. In the second scan process, the entire document in the main scanning direction and the document from the half position in the long-side direction to the trailing edge in the sub-scanning direction are to be read. The first scan process and the second scan process may be performed in a reversed order. Determination of the reading position and the like at this time are described in detail with reference to flowcharts in FIG. 8 and FIG. 9.

Initially, in response to the user issuing an instruction to perform book scanning, the scanner configuration information is acquired in step S801. In step S802, it is determined in which of the book scan modes the operation is to be performed, based on the acquired configuration information.

If it is determined in step S802 that the line sensor length, namely, the length in the main scanning direction in which reading is performable is greater than a maximum length in the sub-scanning direction in which reading is performable (YES in step S802), the processing proceeds to step S803. In step S803, the operation in the book scan mode 1 is performed. If the maximum length in the sub-scanning direction in which reading is performable is greater than or equal to the line sensor length (NO in step S802), the processing proceeds to step S804. In step S804, the reading processing in the book scan mode 2 is performed. In the present exemplary embodiment, it is determined which of the reading processing is to be performed, based on the maximum length in each of the main scanning direction and the sub-scanning direction in which reading is performable; however, information indicating greater one of the maximum reading length in the main scanning direction and the maximum reading length in the sub-scanning direction may be received as "Feed direction" information in the configuration information, and the information may be used for the determination. In the present exemplary embodiment, an example in which the book scan modes 1 and 2 are switched based on the type of the scanner is described; however, the configuration is not limited thereto. For example, the book scan modes 1 and 2 (first mode and second mode) may be switched based on the orientation of the document placed on the platen. More specifically, even for the scanner 101 illustrated in FIG. 4, in a case where a length of the placed document in the long-side direction is less than or equal to the length of the scanner 101 in the sub-scanning direction, the user can place the document either vertically or horizontally. In this case, even for the scanner 101 illustrated in FIG. 4, in a case where the book scan mode 1 is constantly operated, the scan may not be appropriately performed. Thus, a sensor that detects the direction of the document placed on the platen may be provided in the platen, the direction of the document may be specified by using the sensor, and processing of switching the book scan modes 1 and 2 may be performed based on the direction. The book scan modes 1 and 2 may be switched based on the direction and the size of the document.

In step S803, operation in the book scan mode 1 is performed. The operation is similar to the operation in the flowchart of FIG. 6. In a case where it is determined in step S802 that the existing scanner is connected, a sub-routine in the book scan mode 2 is performed in step S804. The sub-routine in the book scan mode 2 is described with reference to the flowchart in FIG. 9.

Figure 9:
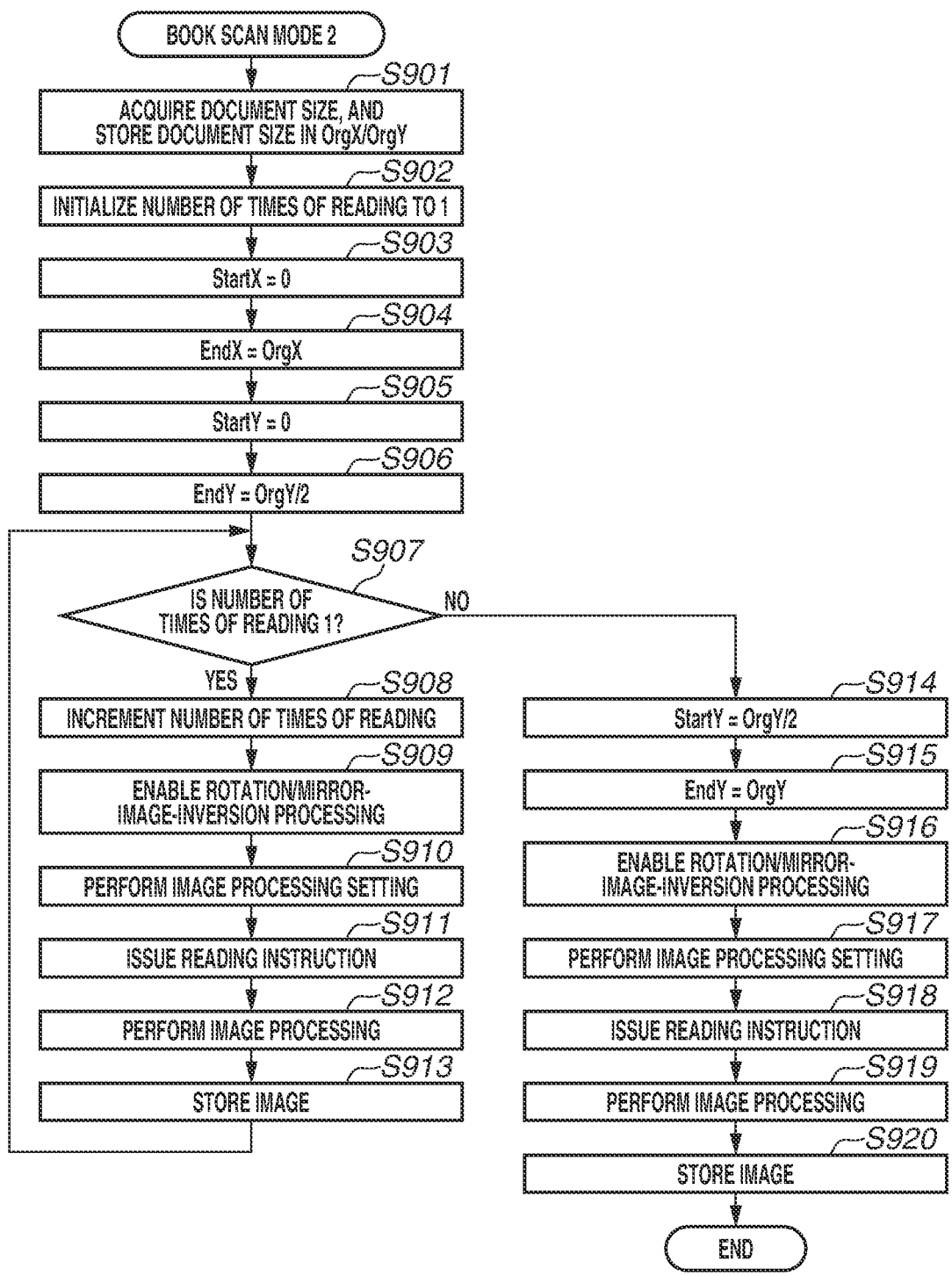
FIG. 9 is a flowchart in the book scan mode 2.

FIG. 9 is a flowchart illustrating an example of the processing in the book scan mode 2. As in the book scan mode 1, in step S901, the information about the document sizes OrgX and OrgY is acquired from the scanner 101. The length of the document in the short-side direction can be acquired as OrgX, and the length of the document in the long-side direction can be acquired as OrgY.

In step S902, the number of times of reading is initialized as in step S602. In step S903, the document start position in the main scanning direction (StartX) is designated as zero corresponding to the origin. Further, in step S904, the document end position in the main scanning direction (EndX) is designated as OrgX.

The document in the main scanning direction is read with the same size without change, in the two scan processes.

Thereafter, in steps S905 and S906, the start position and the end position in the sub-scanning direction are calculated. In the first scan process, in the sub-scanning direction, the document from the leading edge in the sub-scanning direction to the half position of the document length OrgY in the sub-scanning direction, namely, to the position OrgY/2 is read to obtain an image 703. Thus, StartY is set to zero, and EndY is set to OrgY/2. Thereafter, in step S907, a comparison is performed to determine whether the number of times of reading is one. At this point, the scanning is a first scan process (YES in step S907). Thus, the processing proceeds to step S908. In step S908, the number of times of reading is incremented by one for reading of a second page. At this point, the image is read in a direction rotated by 270 degrees from the direction of the document, and the image 703 in a mirror image state is obtained. In step 909, the setting for execution of rotation and mirror-image-inversion processing is performed. In step S910, the setting of the image processing unit 211 is performed. Thereafter, in step S911, the reading instruction is issued. The image is acquired from the scanner 101 and is then subjected to the rotation and the mirror-image-inversion processing by the image processing unit 211. The resultant image is then written to the RAM 204 and is further stored as a first-page image 704 in the storage memory 205. Thereafter, the processing returns to step S907. In step S907, the comparison for the number of times of reading is performed (to determine whether the number of times of reading is one). At this point, the number of times of reading is not one (NO in step S907), and the processing proceeds to step S914. In steps S914 and S915, the reading position in the second scan process is determined. In the second scan process, the document is read from the position OrgY/2 to OrgY in the sub-scanning direction. Therefore, StartY is set to OrgY/2, and EndY is set to OrgY. In other words, the control unit 215 performs the processing of moving the sensor unit from the reference position to the predetermined position and reading the image of the document, and the processing of moving the sensor unit from the reference position to a position different from the predetermined position and reading the image of the document, thus generating third image data and fourth image data.

Thereafter, in step S916, the setting for execution of rotation and mirror-image-inversion processing is performed. In step S917, the setting of the image processing unit 211 is performed. After the setting of the image processing unit 211 is performed, the reading instruction is issued in step S918. In the reading instruction at this time, StartX is designated as zero, EndX is designated as OrgX, StartY is designated as OrgY/2, and EndY is designated as OrgY. The scanner control unit having received the instruction initially drives the stepping motor 305, and moves the sensor unit 302 to the position OrgY.

After the scanner control unit moves the sensor unit 302 to the position OrgY, the scanner control unit issues an image reading start signal to the control unit 215, to notify the control unit 215 of start of image reading. In response to receiving the reading start signal, the control unit 215 receives image data of a designated size from the scanner 101 with this timing as a start point. The received image is a mirror image rotated by 270 degrees, as with a read image 705. Thus, the rotation and the mirror-image-inversion processing are performed by the image processing unit 211 in a manner similar to that performed for the first page. A resultant image is output to the RAM 204, and is then stored as a second-page image 706 in the storage memory 205.

By performing the above-described control flow, it is possible to provide operation in the appropriate book scan mode even with either the scanner according to the first exemplary embodiment or the existing scanner connected.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-186700, filed Nov. 16, 2021, which is hereby incorporated by reference herein in its entirety.

What is claimed is:

1. An image processing apparatus comprising:
   a scanner; and
   a controller,
   wherein the controller determines whether the scanner has a first sensor or a second sensor, the first sensor having a length in a main scanning direction greater than a maximum length in a sub-scanning direction in which reading is performable by change a position of the first sensor, the second sensor having a length in a main scanning direction less than a maximum length in a sub-scanning direction in which reading is performable by change a position of the second sensor, and
   wherein, in a case where the controller determines that the scanner has the first sensor, the controller executes, to read an image of one document placed on a platen glass, processing of changing the position of the first sensor from a reference position to a predetermined position in the sub-scanning direction twice, based on one execution instruction input by a user, and then generates first image data and second image data, an image of the first image data being same with an image of the second image data, and the controller outputs first extraction data generated by executing first extraction processing on the first image data, as one piece of page data, and outputs second extraction data generated by executing second extraction processing on the second image data, as one piece of page data, and
   wherein, in a case where the controller determines that the scanner has the second sensor, the controller executes, to read an image of one document placed on the platen glass, processing of changing the position of the second sensor from a reference position to a middle position in the sub-scanning direction and processing of changing the position of the second sensor from the middle position to a terminal position in the sub-scanning direction, based on one execution instruction input by the user, and then generates third image data and fourth image data, and the controller outputs the third image data, as one piece of page data, and outputs the fourth image data, as one piece of page data.

2. The image processing apparatus according to claim 1, wherein the second extraction processing includes extracting, from an image indicated by the second image data, a portion corresponding to a portion not extracted from an image indicated by the first image data in the first extraction processing.

3. The image processing apparatus according to claim 1, further comprising:
   a printer,
   wherein the printer prints an image based on the first extraction data on one sheet, and prints an image based on the second extraction data on another sheet different from the sheet on which the image based on the first extraction data is printed.

4. The image processing apparatus according to claim 1, wherein, in a case where the controller determines that the scanner has the first sensor and a long length of the document is shorter than the maximum length in the sub-scanning direction in which reading is performable by change the position of the first sensor and an orientation of the document is a specific orientation, the controller executes, to read the image of one document placed on the platen glass, processing of changing the position of the first sensor from the reference position to the predetermined position in the sub-scanning direction twice, based on one execution instruction input by the user, and then generates first image data and second image data, an image of the first image data being same with an image of the second image data.

5. A method for controlling an image processing apparatus including a scanner, the method comprising:
   determining whether the scanner has a first sensor or a second sensor, the first sensor having a length in a main scanning direction greater than a maximum length in a sub-scanning direction in which reading is performable by change a position of the first sensor, the second sensor having a length in a main scanning direction less than a maximum length in a sub-scanning direction in which reading is performable by change a position of the second sensor;
   in a case where it is determined that the scanner has the first sensor, executing, to read an image of one document placed on a platen glass, processing of changing the position of the first sensor from a reference position to a predetermined position in the sub-scanning direction twice based on one execution instruction input by a user, and then generating first image data and second image data, an image of the first image data being same with an image of the second image data, outputting first extraction data generated by executing first extraction processing on the first image data, as one piece of page data, and outputting second extraction data generated by executing second extraction processing on the second image data, as one piece of page data; and
   in a case where it is determined that the scanner has the second sensor, executing, to read an image of one document placed on the platen glass, processing of changing the position of the second sensor from a reference position to a middle position in the sub-scanning direction and processing of changing the position of the second sensor from the middle position to a terminal position in the sub-scanning direction, based on one execution instruction input by the user, and then generating third image data and fourth image data, and outputting the third image data, as one piece of page data, and outputs the fourth image data, as one piece of page data.

* * * * *